Oct. 26, 1937.   R. T. CORNELIUS   2,097,020
BEER DISPENSING DEVICE
Filed Aug. 12, 1935
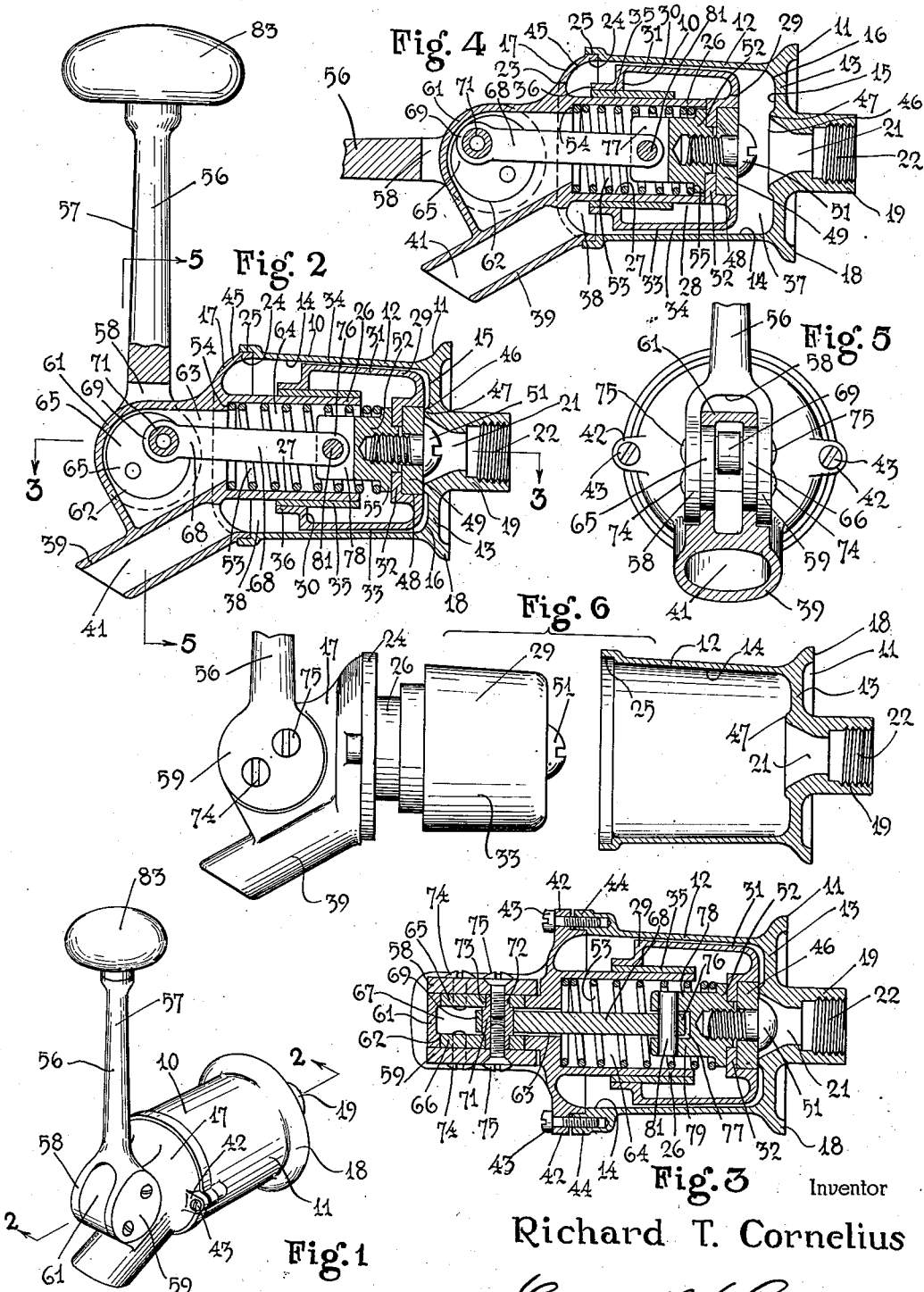
Inventor
Richard T. Cornelius
By Caswell & Lagaard
Attorneys Patented Oct. 26, 1937

2,097,020

UNITED STATES PATENT OFFICE 2,097,020

BEER DISPENSING DEVICE

Richard T. Cornelius, Minneapolis, Minn.

Application August 12, 1935, Serial No. 35,784

13 Claims. (Cl. 225—8)

My invention relates to beer dispensing devices and has for an object to provide a device by means of which the beer may be drawn without foaming with relatively high pressures within the beer container.

Another object of the invention resides in providing a beer dispensing device in which the rate of flow of the beer may be regulated and in which minimum foaming occurs at all rates of flow.

A still further object of the invention resides in providing a beer dispensing device in which a shut-off valve may be used for completely and effectively shutting off the flow of beer.

Another object of the invention resides in providing a beer dispensing device by means of which regulation of the rate of flow of the beer and operation of the shut-off valve is controlled through a single operating member.

An object of the invention resides in providing a beer dispensing device having a restricted passageway of minute thinness through which the beer flows.

Another object of the invention resides in constructing said restricted passageway in such a manner as to minimize agitation of the beer as it flows through said passageway.

An object of the invention resides in constructing the device with a body member having a conical bore and in providing a conical member concentrically disposed within said bore and forming in conjunction therewith said restricted passageway.

Another object of the invention resides in providing a guide for guiding said conical member for axial movement within said bore to vary the thickness of said annular restricted passageway for the purpose of regulating the rate of flow of the beer.

A still further object of the invention resides in forming on said body member either the valve head or valve seat of the shutoff valve and in mounting on the conical member the other of said valve parts, whereby operation of the shut-off valve is procured by means of said conical member.

Another object of the invention resides in constructing the device with a cap closing the open end of the body member and in forming on said cap a hollow boss concentric with respect to said conical bore and along which said conical member is mounted for sliding axial movement with respect to the conical bore.

Other objects of the invention reside in the novel combination and arrangement of parts and in the details of construction hereinafter illustrated and/or described.

In the drawing:

Fig. 1 is a perspective view of a beer dispensing device illustrating an embodiment of my invention.

Fig. 2 is an elevational sectional view taken on line 2—2 of Fig. 1.

Fig. 3 is a plan sectional view taken on line 3—3 of Fig. 2.

Fig. 4 is a fragmentary sectional view similar to Fig. 2 showing the parts in altered position.

Fig. 5 is a cross sectional view taken on line 5—5 of Fig. 2.

Fig. 6 is a fragmentary cross sectional view similar to Fig. 2 and showing the cap removed from the body member.

My invention has been designed to overcome a number of difficulties inherent with the ordinary beer dispensing systems. Beer as it leaves the brewery in kegs is charged with carbon dioxide gas to an extent of about two and one-half volumes of gas to one of beer. The pressure required to maintain this gas within the beer depends upon its temperature, higher temperatures requiring higher pressures to maintain the original percentage of carbonation. Any reduction of pressure below that necessary to maintain the original percentage of carbonation in the beer will result in reduction in carbonation of the beer, the extent of this reduction depending upon the amount of exposed surface relative to the volume of beer, the length of time the beer stands at reduced pressure and the degree of agitation that the beer receives. If the gas leaves the beer slowly, as when standing in a still barrel, there will be no foam produced in the barrel, but the beer will become what is commonly described as "flat." If the beer is agitated at the same time that the pressure is reduced, such as when it flows from a faucet into a glass, the carbon dioxide will leave the beer fast enough to form bubbles resulting in foam. A certain amount of this foam is desirable and produces what is described as the "collar" to the beer. If the beer flows from the faucet at too high a velocity it will be agitated as it strikes the glass to such an extent that too much foam will result. Such beer is commonly described as "wild." Beer faucets of the common type can be used only in the closed or fully open position as any attempt to reduce the rate of flow by partially closing the faucet results in extreme agitation within the faucet itself and a consequent formation of excess foam. Because of this fact the rate of flow must be determined by the pressure at the faucet. Many beer dispensing installations have so little frictional resistance within the piping that it is hence necessary to use very low pressures on the kegs to produce the desired flow at the faucet. This causes the beer in the keg to become "flat" after standing a short time. With such systems a new keg of beer having a high initial pressure in the barrel will be "wild" at the faucet until the pressure is reduced by drawing off the beer.

Inasmuch as the installation and application of beer dispensing devices to barrels and other receptacles containing beer is well known in the art, the particular manner of installation has not been shown in the drawings. It can readily be comprehended, however, that the device is connected to the beer line at the usual locality. Inasmuch as the invention will operate at practically any pressure, applicant has not thought it necessary to show any pressure system for procuring flow of the beer from the keg to the device, though it can readily be comprehended that any of the usual pump systems or any pressure system utilizing either air or carbon dioxide may be used for the purpose and the pressure raised sufficiently to preserve the original state of the beer and to effect the proper flow of the beer.

My invention comprises a body which I have indicated in its entirety by the reference numeral 10 which contains the moving parts of the invention. This body consists of a body member 11 constructed with a circumferentially extending wall 12 and an end wall 13 connected thereto. The wall 12 is provided with a conical bore 14 while the end wall 13 has a radial surface 15. A curved fillet 16 formed at the juncture of the end wall 13 and circumferential wall 12 provides a streamline deflecting surface between the surface 13 and the bore 14. The body member 11 is open at the end thereof opposite the end wall 13 and is adapted to be closed by means of a cap 17. A flange 18 formed on the end wall 13 serves as a seat adapted to rest against the surface of the fixture to which the tap is to be attached. At the center of the end wall 13 is provided a neck 19 which is constructed with a passageway 21 serving as an inlet passageway leading into the interior of the body member 11. This neck is internally threaded at 22 to permit of connecting the tap to a suitable line or pipe running from the cooling coil of the beer dispensing system or to any portion of the system.

The cap 17 is constructed with an end wall 23 which is formed with a circumferentially extending flange 24. This flange is adapted to be received within a recess 25 in the circumferential wall 12 of body member 11. By means of this recess and flange, the cap 17 is accurately centered with respect to the bore 14 of body member 11. The inner surface of flange 24 lies in continuation of bore 14 and the portion of the wall 23 adjacent the flange 24 is preferably formed with a curved fillet as indicated at 45, which is similar to fillet 16 and serves the same purpose.

For the purpose of securing the cap 17 to the body member 11, the wall 23 of said cap is constructed with two diametrically opposed ears 42. Screws 43 pass through these ears and are threaded into enlargements 44 of the circumferential wall 12 of the body member 11 in proximity to the outer edge thereof.

The cap 17 is constructed with an inwardly extending hollow boss 26 which is formed with a bore 27 upon the interior thereof. This bore extends completely through said boss at one end. The outer surface 28 of boss 26 is accurately turned and is concentric with the bore 14 of body member 11.

Slidably mounted on the boss 26 is a conical head or member 29 which is constructed with a circumferentially extending wall 31 and with end walls 30 and 32 connected therewith. The circumferentially extending wall 31 is provided with a conical surface 33 having throughout the major portion of the length thereof the same degree of taper as the conical bore 14 of body member 11. The diameter of the circumferential wall 31 of the conical member 29 is slightly less than the diameter of the bore 14 so that an annular space 34 is provided between the bore 14 of body member 11 and the surface 33 of member 29. This space forms a thin passageway of extended area which is interposed in the flow of the beer through the device.

The member 29 is supported for sliding motion on the surface 28 of boss 26 by means of a sleeve 35 which is pressed into a hollow boss 36 formed on the end wall 30. This sleeve is preferably constructed of stainless steel to prevent corrosion and is accurately ground to fit boss 26 after being attached to member 29.

The space between the end wall 32 of member 29 and the end wall 13 of body member 11 is designated by the reference numeral 37 and forms an inlet chamber with which the passageway 21 is connected. This chamber is in communication with the annular passageway 34. The other end of the body 10 is provided with a chamber 38 similar to the chamber 37 which serves as an outlet chamber. This chamber is also in communication with the passageway 34. The latter chamber is an annular chamber surrounding the boss 26. Chamber 38 is in communication with a spout 39 best shown in Figs. 2, 4, and 5. The spout 39 is provided with a passageway 41 therethrough through which the beer leaving the tap may be directed into any suitable drinking vessel or container into which the beer is to be collected. This passageway is preferably ovular in form, as shown in Fig. 5, and of generous proportions as compared to the inlet 21. The spout 39 is also arranged on an incline as shown in Figs. 2 and 4. By means of this construction, the beer flows freely from the spout and in a solid stream so that no agitation of the beer occurs in leaving the device. At the same time no vent is required for the chamber 38, the air entering said chamber through the upper portion of the passageway 41.

It will be noted that the passageway 34 is minutely thin as compared to its width or length. It will also be noted that the beer flowing through passageway 34 follows a smooth streamlined surface on entering said passageway and is directed over a smooth streamlined surface after discharging from said passageway. If the member 29 is moved toward the end wall 13 of body member 11, the thickness of the passageway 34 is reduced. By constructing passageway 34 of suitable dimensions and taper, it is possible to set up the proper resistance to the flow of beer through said passageway to secure any desired minimum and maximum rate of flow of the beer. In actual practice a minimum clearance of .001" with a maximum clearance of .015" will provide a gravity flow of fluid at the spout which can be varied in size from a stream approximately ⅛" in diameter to a stream approximately ¾" in diameter using a pressure in the beer barrel of 15 to 40 pounds. When using a higher pressure such as 40 lbs. member 29 will not have to be moved as far from the end wall 13 to obtain a large size stream as would be required if the keg pressure was only 15 pounds.

Although it would be possible to move the member 29 into bore 14 until the passageway 34 was completely closed and thereby shut off the flow of beer from the tap, yet if this were attempted it would require considerable force to dislodge the member 29 from within the bore 14, due to the wedge action which would be procured through the taper of the bore and the said member. In actual construction, the taper is very slight and consequently considerable wedge action results. To eliminate the necessity of shutting off the flow by means of closing the passageway 34, I have provided a shut-off valve 46, best shown in Figs. 2 and 3. Encircling the inlet passageway 21 in end wall 13 of body member 11, is an annular projection 47 which forms a valve seat. The wall 32 of member 29 is constructed with a recess 48 which receives a valve head or facing 49 adapted to seat against the seat 47. This valve head may be constructed of a relatively hard grade of rubber or any other suitable material, such as is now used in the construction of valves. This valve head is held in position by means of a screw 51 which passes through said valve head and the end wall 32 of member 29 and is threaded into a nut 52 disposed upon the interior of the member 29. The valve head 49 is adapted to engage the seat 47 before the passageway 34 is entirely closed off. The construction is so designed that when the valve 46 first becomes fully open, the passageway 34 is of such dimensions as to produce the desired reduction in pressure at the spout 39 and to give the minimum flow. This eliminates cracking of the valve 46 which is substantially fully open at the instant the member 29 is manipulated.

Within the bore 27 of boss 26 is disposed a compression coil spring 53. This spring is seated at one end against a shoulder 54 formed in the boss 26 and at its other end against a collar 55 encircling the nut 52. The spring 53 is designed to overbalance the pressure against the valve head 49 occasioned by the pressure in the inlet opening 21 so that the valve at all times remains closed, excepting when manually opened.

For the purpose of opening the valve 46 and for varying the rate of flow of the beer from the tap, a manually controlled lever 56 is employed. This lever is best shown in Fig. 1 and comprises a shank 57, forked at its lower end to provide two spaced circular ears 58 and 59. At the forward portion of the cap 17 is formed a cylinder 61 which is constructed with a bore 62 situated transversely with respect to the boss 26 and the wall 12. The ears 58 and 59 of lever 56 straddle the cylinder 61 and close the ends of the bore 62. The interior of the cylinder 61 is constructed with a compartment 63 which is in communication with the compartment 64 formed by bore 27 in the boss 26 and with the bore 62. Within the bore 62 are rotatably mounted two disks 65 and 66. These disks are spaced apart to leave a space 67 therebetween. A connecting rod or pitman 68 extends through the compartments 63 and 64 and one end 69 thereof extends into the space 67 between the two disks 65 and 66. A bushing 71 disposed in space 67 is constructed with reduced ends 72 which are received in holes 73 in disks 65 and 66. This bushing also extends through the end 69 of the pitman 68 and forms a shaft on which the said pitman is rotatably mounted. It will be noted that the holes 73 and bushing 71 are eccentrically disposed with respect to the disks 65 and 66 so that a crank action is afforded which reciprocates the pitman 68 when the disks 65 and 66 are rotated. The ears 58 and 59 of lever 56 are attached to the disks 65 and 66 by means of screws 74 and 75. The screws 74 pass through the ears 58 and 59 and are directly threaded into the disks 65 and 66. The screws 75 also pass through the ears 58 and 59 but are threaded into the bushing 71. This construction is best shown in Fig. 3.

The other end 76 of pitman 68 extends into a groove 77 in the end of the nut 52. By means of this groove two legs 78 and 79 are formed on the nut 52. A pin 81 passes jointly through the said legs and the end 76 of pitman 68 providing a pivot attached to member 29 about which the pitman 68 may swing. The parts are so designed that when the lever 56 is in the position shown in Figs. 1 and 2, the valve 46 is closed. At such time the axis of the bushing 71 is to the right of the center of the bore 62. When the lever 56 is swung to occupy a horizontal position, as shown in Fig. 4, the valve 46 is fully open and the thickness of the passageway 34 is the greatest. The maximum rate of flow is then procured. At such position the axis of the bushing 71 is to the left of the center of the bore 62. When the lever 56 is released, spring 53 carries the lever back to the position shown in Fig. 2 and at the same time forces the valve head 49 against the seat 47, closing valve 46.

Where reduction of pressure has been attempted in other beer dispensing systems, considerable difficulty has been encountered in attempting to clean the systems. By means of the removable cap 17, the cap and member 29 which is mounted thereon, may be readily withdrawn from the body member 11, as shown in Fig. 6. This exposes the surface 33 of member 29 as well as the surface forming the bore 14 of body member 11. These parts while so exposed are readily accessible and may be easily cleaned. A system embodying the present invention is adapted to be cleaned by means of any of the methods now in common use for cleaning beer dispensing systems. When this is desired, the cap 17 is removed and another cap having a hose connection formed thereon is substituted in place of cap 17. Steam or abrasive particles in suspension in either a gas or liquid is forced through the system and the interior of the system scoured the same as where ordinary beer faucets are used. After the system has been cleaned the cap 17 and the member 29 mounted thereon is replaced and the device is again ready to be used. By grinding the bore within the sleeve 35 and the surface 28 of the boss 26 on which the said sleeve travels, a substantially tight joint is formed therebetween. Due to the fact that the pressure within the chamber 38 is greatly reduced, practically no beer leaks into the interior of the member 29 through said joint. It hence becomes unnecessary to remove the said member when the tap is being cleaned. However, if removal is desired, the same is easily accomplished by merely unscrewing the screw 51, whereupon the member 29 can be removed to give access to the parts within the same.

The method of using my invention is as follows: The ordinary beer faucet on any existing beer dispensing system is merely removed and my improved device substituted in place thereof. The pressure in the system may thereafter be maintained at any pressure up to thirty or forty pounds per square inch, if desired. If wooden kegs are used for the storage of beer, pressures, of not over twenty-five pounds per square inch, are recommended, due to the inherent weakness of wooden kegs as compared to steel drums or barrels. After the beer tap has been properly connected to the system, it is merely necessary to manipulate the lever 56 to procure the desired results. A slight movement of said lever downwardly opens the valve 46 fully and maintains a relatively close spacing of the surface 33 of member 29 with respect to the bore 14 of member 11. This regulates the flow of beer so that a relatively slow rate of flow results. If a greater rate of flow is desired, lever 56 is moved still further. When the lever reaches its horizontal position as shown in Fig. 4, the maximum flow has been procured. By stopping the lever 56 at any predetermined intermediate position any predetermined rate of flow can be procured. By means of my particular construction, a clear beer can be drawn at any position of the lever 56, by running the beer along the side of the glass or other vessel into which the same is to be drawn. Any amount of foam can be procured on the drawn beer by allowing the beer to be discharged directly into the center of the vessel when the same is partly or nearly filled.

My invention is highly meritorious in that an extremely simple and practical device is provided whereby beer may be drawn without the excessive foaming occasioned with the systems now in customary use for the purpose. My invention may be installed with any of the systems now in use for the purpose of dispensing beer by merely replacing the beer faucets used in such system with my improved device. With my invention any suitable pressure may be used in the system, thereby adapting the device for use in systems where the ordinary beer faucet could not be used. My improved device may be easily cleaned and is readily taken apart for such purpose so that the same will with proper care last indefinitely. The valve head used with my invention may be readily replaced when occasion demands and is constructed so that the same can be furnished at a trivial cost. By constructing the spout in the manner shown, a uniform solid stream of beer leaves the device which is attractive in appearance and which prevents agitation of the beer and excessive foaming thereof. The installation of my invention with beer systems does not require any change or alteration of the system and permits of appreciably increasing the pressure in the barrel. By changing the rate of flow into the glass and by holding the glass in different positions, it is possible to secure different degrees of agitation within the glass and thereby secure any percentage of foam and clear beer from all foam to all clear. The "wild" beer due to high pressure is entirely eliminated by my invention.

Changes in the specific form of my invention, as herein disclosed, may be made within the scope of what is claimed without departing from the spirit of my invention.

Having described my invention, what I claim as new and desire to protect by Letters Patent is:

1. A beer dispensing device including a body member having a conical bore, a conical member disposed within said bore and forming in conjunction therewith an annular passageway, said beer dispensing device having an inlet and an outlet communicating with said passageway, means for guiding said conical member for axial movement relative to the bore to vary the thickness of said passageway, and a shut-off valve at one end of said passageway, said shut-off valve including a seat and a valve head, one thereof being carried by said conical member and being moved thereby to open said valve as the thickness of the constricted passageway is increased the taper of said bore and member being such as to provide a restricted passageway offering appreciable resistance to the flow of beer through the device when the valve is fully open.

2. A beer dispensing device including a body member having a conical bore and open at one end, a cap for closing said open end of the body member, a guide, said member forming in conjunction with said bore an annular passageway concentric with said bore, a conical member slidable along said guide, said conical member and body member having juxtaposed parts, one of said parts having a valve seat and the other having a valve head for engagement therewith, a lever pivoted to said cap and a pitman connected to said lever and conical member for simultaneously opening said valve and moving said conical member in a manner to increase the thickness of said annular passageway.

3. A beer dispensing device including a body member having a conical bore and open at one end, a cap for closing said open end of the body member, a guide, said member forming in conjunction with said bore an annular passageway concentric with said bore, a conical member slidable along said guide, said conical member and body member having juxtaposed parts, one of said parts having a valve seat and the other having a valve head for engagement therewith, a lever pivoted to said cap, a pitman connected to said lever and conical member for simultaneously opening said valve and moving said conical member in a manner to increase the thickness of said passageway, and a spring seated against said cap and conical member for urging said valve into closing position.

4. A beer dispensing device including a body member having an end wall and a circumferentially disposed wall open at one end and provided with a conical bore, said member having an inlet opening in said end wall concentric with said bore, a valve seat formed on said end wall and encircling said inlet opening, a conical member concentrically disposed within said bore and forming in conjunction therewith an annular passageway, said member being spaced from the end wall of said body member to provide an inlet chamber communicating with said annular chamber, a valve head on said conical member for engagement with said valve seat, an outlet communicating with the other end of said annular passageway, a guide for guiding said conical member for movement toward and from said seat, and means for moving said conical member along said guide.

5. A beer dispensing device including a body member having a conical bore and open at one end, a cap for closing said open end of the body member, a conical member concentrically disposed within said bore, a guide on said cap comprising a hollow boss concentric with said bore and guiding said conical member for axial movement with respect to said bore, a spring within said boss seated at one end against said cap and at the other end against a part movable with said conical member, and means for sliding said conical member along said guide against the action of said spring.

6. A beer dispensing device including a body member having a conical bore and open at one end, a cap for closing said open end of the body member, a conical member concentrically disposed within said bore, a guide on said cap comprising a hollow boss concentric with said bore and guiding said conical member for axial movement with respect to said bore, a spring within said boss seated at one end against said cap and at the other end against a part movable with said conical member, a crank journaled in said cap and a pitman connected to said crank and conical member for sliding said conical member along said boss.

7. A beer dispensing device including a body member having a conical bore and open at one end, a cap for closing said open end of the body member, a conical member concentrically disposed within said bore, a hollow guide for guiding said conical member for axial movement with respect to said bore, said conical member having an end wall, a spring within said guide seated at one end against said cap and at the other end against a part movable with said conical member, said cap having a cylinder formed with a bore therein transversely disposed with respect to the bore of said body member, a lever having two spaced ears straddling said cylinder and covering the ends of the bore, two spaced disks disposed within the bore of said cap and journaled therein, a pitman eccentrically connected to said disks and to said conical member, said pitman being disposed between said disks, and means for securing the ears of said lever to said disks.

8. A beer dispensing device including a body member having a circumferential wall and an end wall and formed with a conical bore open at one end, a cap for closing the open end of the body member, an inlet opening in said end wall concentric with said bore, a valve seat surrounding said opening, a guide, a conical member concentrically disposed within said conical bore and slidable along said guide, said conical member having a recess at the inner end thereof, a valve head disposed within said recess, a screw, a clamp nut for holding said valve head disposed within said recess, and means engaging said clamp nut for moving said conical member and valve head along said guide.

9. In a beer dispensing device, a body member having a passageway therein, a core member disposed within said passageway and constricting the same, said passageway and member being of such form that movement of said member in one direction enlarges said passageway, a valve for controlling flow into said passageway, and a lever pivoted to the body member and connected to the core member and movable part of the valve, said lever upon movement in one direction opening said valve and causing movement of said core member in a direction to enlarge said passageway.

10. A beer dispensing device including a body member having a conical bore, supporting means carried by the body member at one end of the bore, a hollow conical member disposed within said bore and a guide carried by said supporting means and received within said hollow conical member, said guide supporting said conical member for sliding movement within said bore.

11. A beer dispensing device including a body member having a conical bore, a hollow conical member within said bore, guide means received within said hollow conical member and guiding said conical member for longitudinal movement within said bore, a crank oscillatable about an axis disposed in fixed relation to said body member, and a pitman connected to said crank and conical member for reciprocating said conical member within said bore.

12. A beer dispensing device including a body member having a conical bore, supporting means carried by the body member at one end of the bore, a hollow conical member disposed within said bore, a tubular guide carried by said supporting means and received within said hollow conical member, said guide supporting said conical member for sliding movement within said bore, a crank at the end of said tubular guide and a pitman connected to said crank and conical member and extending into said tubular guide.

13. A beer dispensing device including a body member having a conical bore, supporting means carried by the body member at one end of the bore, a hollow conical member disposed within said bore, a tubular guide carried by said supporting means and received within said hollow conical member, said guide supporting said conical member for sliding movement within said bore, and means for reciprocating said conical member said means extending through said tubular guide.

RICHARD T. CORNELIUS.